(12) United States Patent
Maida et al.

(10) Patent No.: US 8,855,644 B2
(45) Date of Patent: Oct. 7, 2014

(54) CREATING NEIGHBOUR CELL LISTS (71) Applicant: Ubiquisys Limited, Swindon (GB)

(72) Inventors: Aminu Wada Maida, Swindon (GB); Alan James Auchmuty Carter, Swindon (GB); Housam Al Housami, Wiltshire (GB)

(73) Assignee: Ubiquisys Limited, Swindon (GB)

( * ) Notice: Subject to any disclaimer, the term of this patent is extended or adjusted under 35 U.S.C. 154(b) by 0 days.

(21) Appl. No.: 13/748,478

(22) Filed: Jan. 23, 2013

(65) Prior Publication Data
US 2013/0178212 A1 Jul. 11, 2013

Related U.S. Application Data (63) Continuation of application No. 12/820,992, filed on Jun. 22, 2010, now Pat. No. 8,559,953.

(30) Foreign Application Priority Data

Aug. 11, 2009 (GB) .................................. 0914021.1

(51) Int. Cl.
*H04W 36/00* (2009.01)
*H04W 36/24* (2009.01)
*H04W 84/04* (2009.01)

(52) U.S. Cl.
CPC ........ *H04W 36/0061* (2013.01); *H04W 36/245* (2013.01); *H04W 84/045* (2013.01); *H04W 36/0083* (2013.01)
USPC ............................ 455/436; 455/561; 370/331

(58) Field of Classification Search
None
See application file for complete search history.

(56) References Cited

U.S. PATENT DOCUMENTS

| 6,061,337 | A | 5/2000 | Light et al. |
| 6,411,819 | B1 | 6/2002 | Gutowski |
| 7,110,766 | B1 | 9/2006 | Tayloe et al. |
| 8,412,274 | B2 * | 4/2013 | Hoshina et al. ............ 455/562.1 |
| 2005/0048974 | A1 | 3/2005 | Kim et al. |
| 2005/0282546 | A1 | 12/2005 | Chang et al. |
| 2007/0097938 | A1 | 5/2007 | Nylander et al. |

(Continued)

FOREIGN PATENT DOCUMENTS

| JP | 2009-049922 | 3/2009 |
| KR | 20050059519 | 6/2005 |

(Continued)

OTHER PUBLICATIONS

International Search Report and Written Opinion dated Aug. 6, 2010 from PCT Application No. PCT/GB2010/050696.
United Kingdom Combined Search and Examination Report dated Feb. 7, 2012.

(Continued)

*Primary Examiner* — Erika A Washington
(74) *Attorney, Agent, or Firm* — Weaver Austin Villeneuve & Sampson LLP (57) ABSTRACT A neighbor cell list is formed, for use in a basestation of a cellular communications network. For each of a plurality of neighbor cells, a value of a first component is assigned, depending on whether or not the basestation can detect signals transmitted from said neighbor cell. A value of a second component is assigned, depending on a history of successful or unsuccessful handover attempts to said neighbor cell. The values of the first and second components are combined to form a weighting parameter, for use in determining a handover priority to be given to said neighbor cell in the neighbor cell list.

6 Claims, 4 Drawing Sheets

(56) References Cited

U.S. PATENT DOCUMENTS

| | | |
|---|---|---|
| 2008/0227455 A1 | 9/2008 | Kim |
| 2010/0150109 A1* | 6/2010 | Bradley et al. ............... 370/331 |
| 2010/0203891 A1 | 8/2010 | Nagaraja et al. |
| 2010/0315967 A1* | 12/2010 | Patel et al. .................... 370/252 |
| 2011/0039520 A1 | 2/2011 | Maida et al. |

FOREIGN PATENT DOCUMENTS

| | | |
|---|---|---|
| WO | 01/13526 | 2/2001 |
| WO | 2006/100401 | 9/2006 |
| WO | 2009/005725 | 1/2009 |
| WO | WO 2009/021213 | 2/2009 |
| WO | 2009/064931 | 5/2009 |
| WO | WO 2009/067454 | 5/2009 |
| WO | WO 2011/018640 | 2/2011 |

OTHER PUBLICATIONS

United Kingdom Intellectual Property Office Search Report dated Nov. 9, 2009, issued in GB0914021.1.
First Examination Report in European Patent Application No. EP10725834.5 dated Nov. 29, 2012.
Office Action dated Sep. 18, 2012, U.S. Appl. No. 12/820,992.
Notice of Allowance dated Jun. 10, 2013 issued in U.S. Appl. No. 12/820,992.
Final Office Action dated Mar. 7, 2013 issued in U.S. Appl. No. 12/820,992.
JP Office Action dated Dec. 13, 2013 for JP Application No. 2012-524282.
RU Office Action dated Dec. 18, 2013 for RU Application No. 201210804407.
CN Office Action dated Mar. 28, 2014 for CN Application No. 201080035722.0.

* cited by examiner

CREATING NEIGHBOUR CELL LISTS

This application is a continuation that claims priority to U.S. patent application Ser. No. 12/820,992, filed on Jun. 22, 2010, and entitled "CREATING NEIGHBOUR CELL LISTS", now U.S. Pat. No. 8,559,953, which in turn claims priority to GB 0914021.1, filed Aug. 11, 2009, and entitled "CREATING NEIGHBOUR CELL LISTS". Both of these prior applications are hereby incorporated by reference and for all purposes.

This invention relates to a mobile communication network, and in particular to methods and systems whereby a cellular basestation can create its neighbour cell lists.

It is known to establish femtocell access points in a building, in order to provide improved coverage for users of a cellular communication network, amongst other advantages. When a registered user device is within the coverage area of a femtocell access point, it can establish a connection with that access point, with the connection from the access point into the core network of the cellular network being established over a pre-existing broadband internet connection, for example. When the user leaves the coverage area of the femtocell access point, the connection can be handed over to another femtocell, or to a macrocell base station of the cellular network.

It is also known to establish a network of such femtocell access points.

One issue that arises with all cellular communications networks is that it is necessary for each basestation to establish a list of neighbour cells, so that each user equipment in the cell served by that basestation can be aware of the neighbour cells, in order to be able to change to one of those neighbour cells when appropriate.

In the case of femtocell access points, each is responsible for creating its own list of neighbour cells, in a way that attempts to ensure a good possibility of a successful handover for the user equipments, without forcing those user equipments to make excessive numbers of measurements on large numbers of neighbour cells.

Where there is a network of femtocell access points, for example within a single building or otherwise within a relatively small area, each needs to create a neighbour cell list that allows the user equipments to obtain acceptable signal quality over the whole of the intended coverage area.

In accordance with aspects of the invention, this problem is solved by forming a neighbour cell list that includes other femtocell access points within the network, As there is a high probability that some of the other femtocell access points will be sharing a channel and a scrambling code, a mechanism is provided for determining handover priorities to be given to the neighbour cells in the neighbour cell list.

According to a first aspect of the present invention, there is provided method of forming a neighbour cell list, for use in a basestation of a cellular communications network, the method comprising, for each of a plurality of neighbour cells:
  assigning a value of a first component, depending on whether or not the basestation can detect signals transmitted from said neighbour cell;
  assigning a value of a second component, depending on a history of successful or unsuccessful handover attempts to said neighbour cell; and
  combining the values of the first and second components to form a weighting parameter, for use in determining a handover priority to be given to said neighbour cell in the neighbour cell list.

Thus, the handover priority to be given to a particular neighbour cell can be determined based on whether or not the basestation can detect signals transmitted from that neighbour cell, and on a history of successful or unsuccessful handover attempts to that neighbour cell.

According to other aspects of the invention, there are provided basestations and networks of such basestations.

For a better understanding of the present invention, and to show how it may be put into effect, reference will now be made, by way of example, to the accompanying drawings, in which:—

Figure 1:
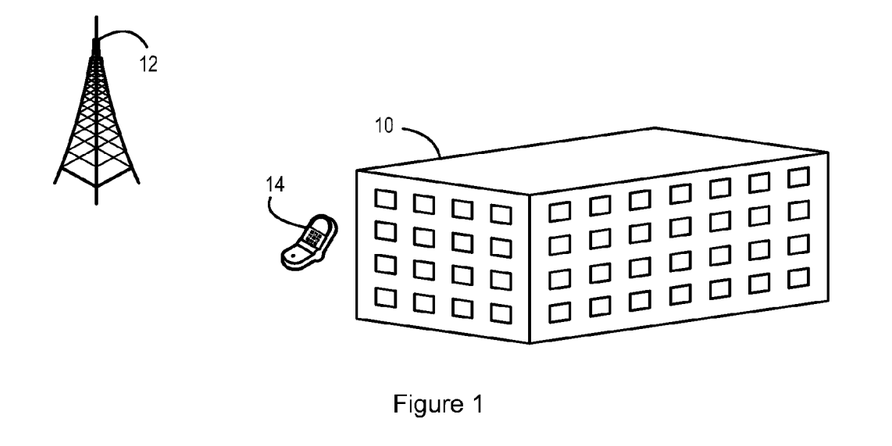
FIG. 1 shows a building in a coverage area of a cellular communications network.

FIG. 1 shows a building 10, which is located within the coverage area of a macrocell base station 12 of a cellular communications network. Thus, user devices, such as mobile phones 14, laptop computers and the like, that are in the vicinity of the building 10 can obtain a cellular service by establishing a connection into the cellular network through the macrocell base station 12. The invention is described herein with reference to an embodiment in which the cellular communications network is a UMTS network. In such a situation, it is also common that the network operator will also have another cellular communications network, for example a GSM network, providing coverage to the same coverage area. In that case, there is a degree of connection between the networks such that a user equipment that is able to operate in both networks is able to handover seamlessly between in them, by means of an inter-RAT (Radio Access Technology) handover.

It is known that cellular coverage within buildings can be poor, leading to unavailability of service, or forcing user devices to transmit signals at high transmit powers, leading to shorter battery life.

Femtocell access points are therefore deployed within the building 10, with the intention that user devices located within the building at least should be able to obtain a cellular service by establishing a connection into the cellular network through one of the femtocell access points.

Although the invention is described herein with reference to the deployment of femtocell access points within a building, within which users are expected to circulate, such as an office building, an educational establishment, or a shopping mall, it will be apparent that the invention is applicable to other situations. For example, the invention is equally applicable to outdoor deployment of femtocell access points, especially but not exclusively in locations where there is common ownership and/or management of an area in which users are expected to circulate.

Figure 2:
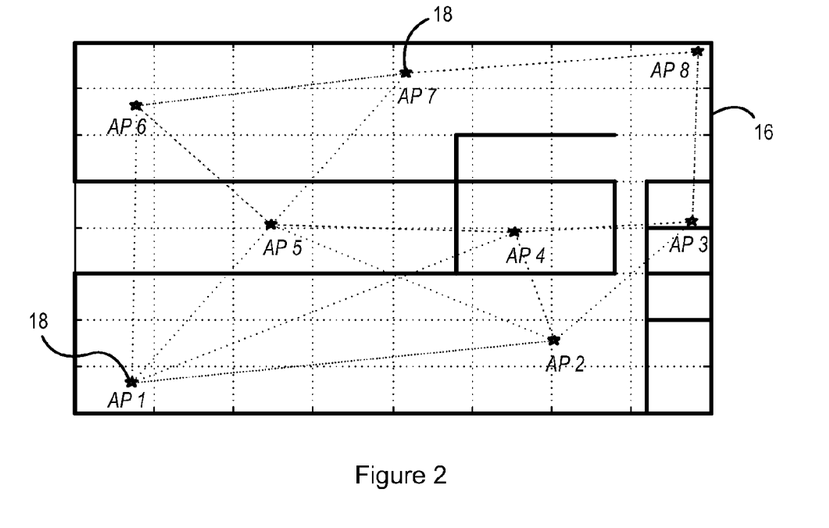
FIG. 2 shows the deployment of multiple femtocell access points in the building.

FIG. 2 is a schematic representation of one level 16 within the interior of the building 10. In this example, the building 10 is an office building, and the whole of the level 16 is occupied by a single corporate entity. Based on the number of expected users within the level 16 at any one time, a suitable number of femtocell access points 18 are deployed. The eight femtocell access points shown in FIG. 2 are indicated as AP1-AP8. These femtocell access points form an enterprise group. That is, they are managed by the single corporate entity, and are organized such that any user equipment that is allowed to register with one of the femtocell access points is able to register with any of them, meaning that the femtocell access points within the group can self-organize, in order to improve the overall service delivery.

The femtocell access points 18 are located in suitable positions. For example, it may be appropriate to provide a femtocell access point close to the or each entrance/exit point, so that users entering or leaving the building can spend as long as possible connected to one of the femtocell access points. In addition, the femtocell access points should be distributed throughout the space, so that any user within the space will be able to establish a connection with one of the femtocell access points.

Figure 3:
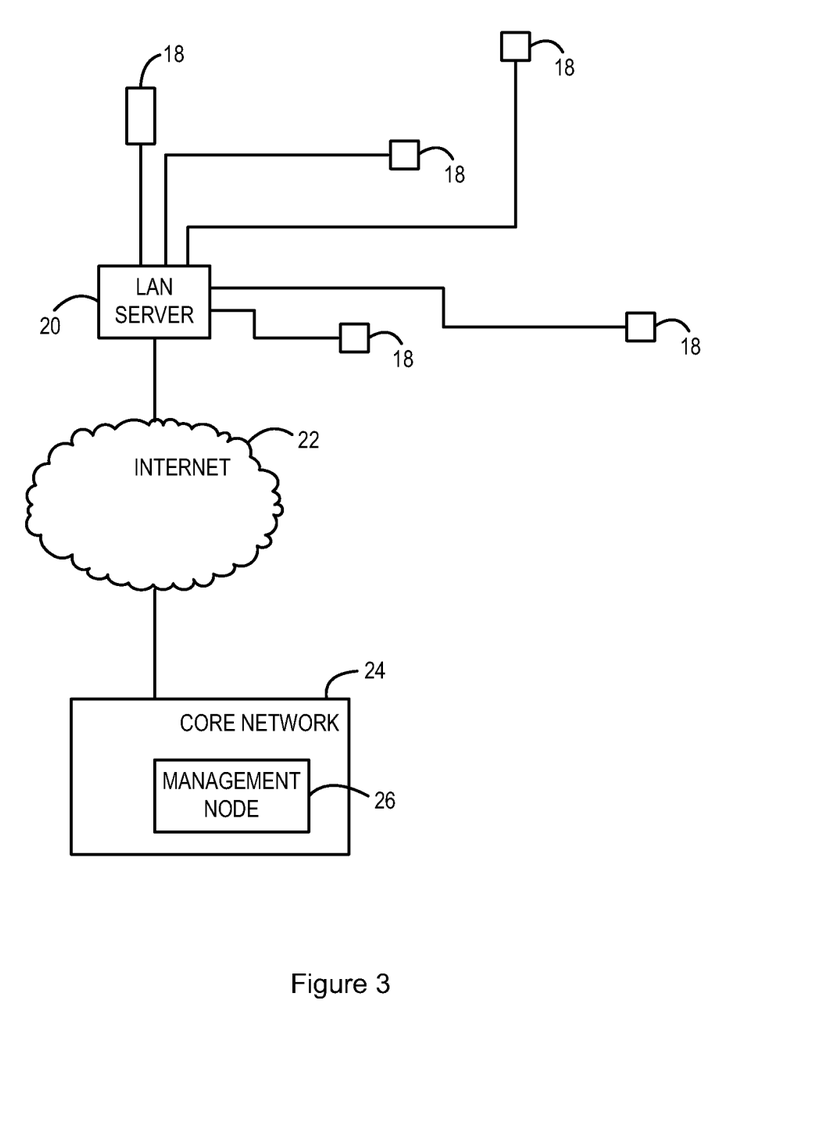
FIG. 3 is a schematic illustration showing the presence of femtocell access points in a wider communications network.

FIG. 3 is a schematic diagram, illustrating network connections of the femtocell access points. Specifically, the femtocell access points 18 in a group are all connected to a local area network (LAN) having a LAN server 20, which also has a connection to a wide area network 22, in particular a public wide area network such as the internet. The femtocell access points 18 are able to connect over the wide area network 22 to a core network 24 of the cellular communications network. The core network 24 includes a management node 26, which monitors and controls where necessary the operation of the femtocell access points 18.

In one embodiment of the invention, the management node 26 distributes to all femtocell access points 18 in the group the relevant information about the group, including: the IDs of all femtocell access points in the group; and their main RF parameters, such as the UTRA Absolute RF Channel Number (UARFCN) and scrambling code (SC), the Location Area Code (LAC) and Cell-ID, and the initial power levels.

Thus, the invention is described herein with reference to its use in an access point operating in accordance with existing cellular standards set by 3GPP. However, it will be appreciated that the same techniques can be used in networks using all existing and future networks in which the initial downlink power of an access point or basestation can be set based on information available at the time.

In this embodiment, the femtocell access point can enter the downlink monitor mode, in which it can detect signals transmitted by other femtocell access points, to capture the identities of the neighbouring femtocell access points. Thus, by matching the detected UARFCN/SC and LAC/Cell-ID transmitted by each femtocell access point with the information received from the management node 26, the femtocell access point 18 is able to populate automatically the neighbour table. This can then be used in the case of handovers for local mobility. Thus, mobility within the group is fully supported. Cell-reselection with other femtocell access points is achieved by each broadcasting the relevant carrier and scrambling code information. Handover from one femtocell access point to another can be achieved because each femtocell access point has a full map of its neighbour femtocell access points, including their IDs, and so it can send a handover command that is unequivocally pointing to a specific femtocell access point. Full support is provided for circuit-switched (CS), packet-switched (PS) and multiple Radio Access Bearer (Multi-RAB) call mobility, and for intra-frequency and inter-frequency handovers between femtocell access points.

In addition, each femtocell access point receives periodic measurement reports from its connected user equipments, with these reports indicating the signal strengths of intra-frequency neighbouring femtocell access points. Further, each femtocell access point sends measurement control messages to its connected user equipments that are operating in compressed mode, requiring them to provide periodic measurements of their inter-frequency neighbouring femtocell access points.

Further, each femtocell access point is able to communicate with the other femtocell access points by means of the local area network to which they are connected.

In order to be able to achieve the handovers that are necessary for each user equipment to obtain the intended level of service, it is necessary for each femtocell access point to create multiple neighbour cell lists. Specifically, it is necessary in each femtocell access point to create neighbour cell lists for user equipments that are in Idle Mode (i.e. do not have any active calls) and in Connected Mode (i.e. have at least one active call), and it is also necessary to create separate neighbour cell lists for Intra-frequency cells (i.e. cells operating on the same frequency as the first cell), Inter-frequency cells (i.e. cells operating on a different frequency from the first cell), and Inter-RAT cells (i.e. cells using a different access technology from the first cell, such as GSM cells when the first cell is a UMTS cell).

In this embodiment of the invention, the femtocell access point supports Idle Mode mobility between different enterprise groups but supports Connected Mode mobility only within a single enterprise group.

Figure 4:
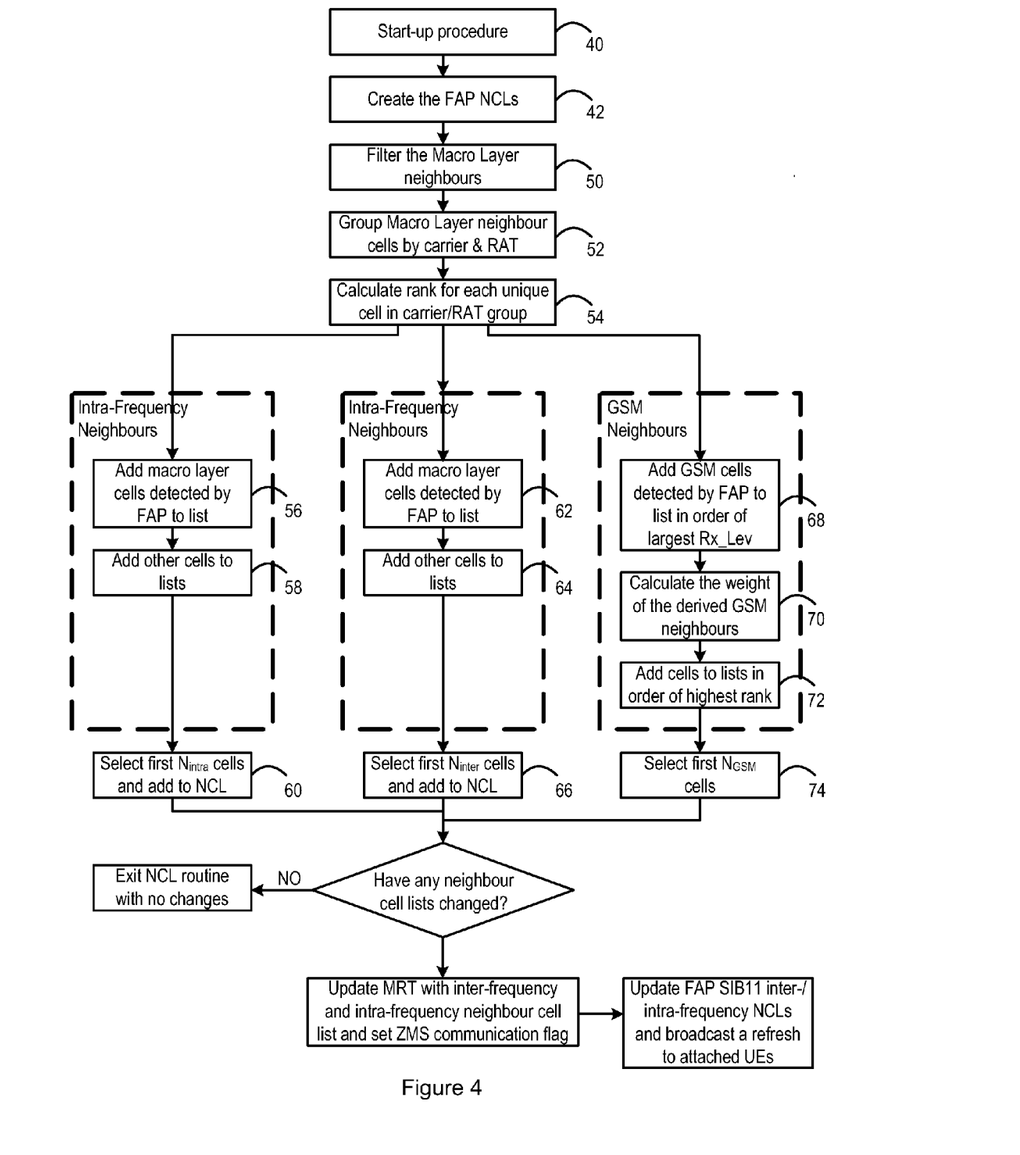
FIG. 4 is a flow chart illustrating a first process in accordance with the present invention.

FIG. 4 is a flow chart illustrating in general terms the procedure that is followed in a femtocell access point when creating its neighbour cell lists. This procedure is preferably performed whenever the femtocell access point is powered up. The procedure can then be performed again whenever it appears that it would produce different results, for example, when the femtocell access point detects signals from a new nearby femtocell access point.

In FIG. 4, the process begins at step 40. As part of the startup procedure, the femtocell access point has already selected the carrier on which it will operate, and the primary scrambling code that it will use to identify its transmissions.

In addition, the femtocell access point receives information in the form of a Master Relationship Table (MRT). The Master Relationship Table includes the following information about each femtocell access point in the group, namely: the unique Cell ID of the femtocell access point; the Group ID of the femtocell access point; the frequency and Primary Scrambling Code selected by the femtocell access point; the Cell ID, Primary Scrambling Code, UTRA Absolute RF Channel Number (UARFCN), CPICH Tx power adjustment and CPICH Tx power of other femtocell access points and Macro Layer nodeBs detected by that femtocell access point; and strongest detected cell information.

Whenever a femtocell access point powers up for the first time it broadcasts a message to indicate that it is now part of the network. A random femtocell access point then sends it a copy of the MRT so that it can start its automatic configuration.

New femtocell access points are always added into the MRT with a particular time stamp (known as the creation time stamp). The priority of the femtocell access point is sometimes determined by the value of the time stamp, as described below.

Whenever a femtocell access point changes its configuration (either chooses a new frequency and/or scrambling code, or updates the Mobility Table) it will rebroadcast the MRT over the local area network with these changes. In addition, the management system may remove femtocell access points from the MRT if they appear to be inactive.

Further, the femtocell access point receives information obtained in its own downlink monitor mode (DLMM). In the DLMM, the femtocell access point is able to detect signals transmitted by other basestations, and is able to obtain the identity of each cell from which it is able to detect signals, and additional information such as the transmit powers used by such cells.

In step 42, the femtocell access point creates the lists of femtocell neighbours. This process is shown in more detail in FIG. 5.

Figure 5:
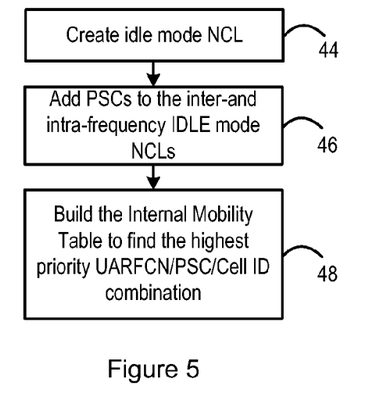
FIG. 5 is a flow chart illustrating in more detail a part of the process shown in FIG. 4.

Thus, in step 44 in FIG. 5, the femtocell access point creates its Idle Mode femtocell neighbour cell list. To avoid coverage holes (that is, a situation where a UE can detect two femtocell access points, but the two femtocell access points cannot detect each other), one advantageous solution is for each femtocell access point to transmit in its neighbour cell lists all of the External and Internal scrambling codes that appear in the MRT. An external scrambling code is one which can appear in the neighbour cell lists of macro layer basestations, while an internal scrambling code is one which cannot appear in the neighbour cell list of any macro layer basestation. The management node 26 will provide to the femtocell access point a list of Internal and External Scrambling codes for the enterprise, as determined by the Network Operator.

Thus, in this embodiment, the Idle Mode neighbour cell list would include all the scrambling codes (both external and internal) that are used by all enterprise groups that appear within the MRT received by the femtocell access point. For example if two scrambling codes SC1 and SC2 are used (and reported through the MRT) by femtocell access points in Groups 2 and 3 respectively, then a femtocell access point in Group 2 would have both SC1 and SC2 in its Idle Mode neighbour cell list. Only femtocell access points that are marked as active (i.e. not stale) in the MRT would be incorporated in the Idle Mode neighbour cell list. The femtocell access point therefore scans the MRT, in order to identify any scrambling codes that are used by any femtocell access point in any group mentioned in the MRT.

In step 46, these scrambling codes are added to the inter-frequency Idle Mode neighbour cell list and/or the intra-frequency Idle Mode neighbour cell list, as appropriate.

In step 48, the femtocell access point creates its Internal Mobility Table, or Connected Mode neighbour cell list. More specifically, the creation of the Connected Mode neighbour cell list involves selecting a subset of the scrambling codes that are present in the Idle Mode neighbour cell list, and then involves finding the cells (as identified by the combination of UARFCN, primary scrambling code and Cell ID) with the highest priority.

In this embodiment, the Connected Mode neighbour cell list for a femtocell access point can include all the scrambling codes (both external and internal) that are used by the same enterprise group that appear within the MRT received by the femtocell access point. For example if two scrambling codes SC1 and SC2 are used (and reported through the MRT) by femtocell access points in Groups 2 and 3 respectively, then a femtocell access point in Group 2 would have SC1, but not SC2, in its Connected Mode neighbour cell list. Again, only femtocell access points that are marked as active (i.e. not stale) in the MRT would be incorporated in the Connected Mode neighbour cell list.

Thus, these scrambling codes may be a subset of the Idle Mode neighbour cell list (if the number of femtocell access points in the enterprise group is less than the number of available External and Internal PSCs). The femtocell access point communicates the Connected Mode neighbour cell list to its connected UEs through the measurements control message. Hence the System Information Block) SIB 12 indicator in SIB 11 indicates that the UE should not read SIB 12 in connected mode but rather should read SIB 11.

Since there could be multiple femtocell access points within an enterprise group with the same PSC, the handover destination is also Cell ID dependant, and it is necessary to prioritize the cells so that a handover can be triggered based on a priority order. In order to set the priority of Cell IDs, a weighting function is calculated to determine the most likely femtocell access point with that PSC and hence that having the highest priority.

Figure 6:
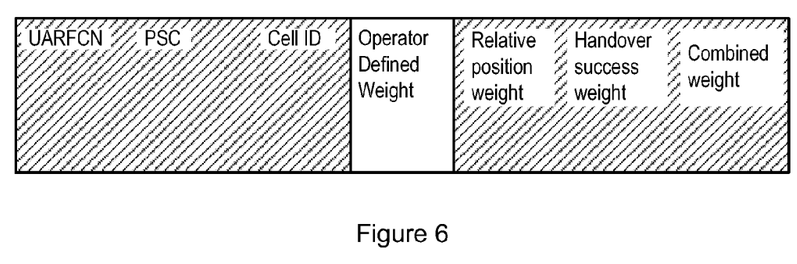
FIG. 6 illustrates a form of a Mobility Table constructed during the process shown in FIG. 5.

FIG. 6 shows the structure of the Internal Mobility Table, containing the Connected Mode neighbour cell list. Specifically, each entry contains one combination of UARFCN, PSC, and Cell ID. The objective of creating the Internal Mobility Table List is then to rank these entries in order of highest to lowest priority. The Internal mobility table should be thought of as a mapping table. It is not necessarily the case that a primary scrambling code measured by the UE corresponds to one and only one target cell. For example, if the UE measures PSC3 and PSC3 has not been identified as a neighbour before, the femtocell access point is expected to sequentially try the femtocell access points in the same Group which happen to use PSC3.

The process of creating the Internal Mobility Table begins by defining the size of the Internal Mobility Table, and setting all cells within the Table to zero, and then the process of populating the table can begin. All of the cell values are set to zero at power up, in order to account for the fact that the femtocell access point may have been relocated to a different position since it was last in operation.

Firstly, the MRT is searched to find every combination of UARFCN, PSC and Cell ID that appears for the enterprise group. Other femtocell access points and macro layer cells are excluded from this search. However, the search does not distinguish between External and Internal PSCs. The cells that are found are then examined in more detail, depending on the neighbour relationship of the potential neighbour cell to the femtocell access point performing the process. More specifically, the cells with the more remote relationship are examined first so that, if a cell is encountered twice, the results obtained from the closer relationship will overwrite the results obtained from the more remote relationship.

Thus, the Relative Position weights are set for each cell found in the search. The relative position weight is determined by whether the neighbour is a Tier 1 Detected Neighbour (i.e. a neighbour from which the femtocell access point is able to detect signals when in its Downlink Monitor Mode), a Tier 1 Reciprocated Neighbour (i.e. a neighbour that has been able to detect signals from the first femtocell access point, with the first femtocell access point then learning of this from the MRT), or a Tier 2 Neighbour (i.e. a Detected Neighbour or a Reciprocated Neighbour of a Tier 1 Neighbour). The assumption is that the likeliest handover candidate would be a Tier 1 Detected Neighbour and the second likeliest candidate would be a Tier 1 Reciprocated Neighbour.

It is quite possible that the femtocell access point will be able to detect signals from two Tier 1 Detected Neighbours, i.e. two femtocell access points, that have the same UARFCN and PSC, but of course have different Cell IDs. Since the PSC offsets of the two cells are likely to be different, it may well be possible to differentiate between the signals from these neighbours by applying narrow time filters around the multi-path signals detected from them. Thus, the signals transmitted by one of the neighbours can be distinguished from the signals transmitted by the other, even though they are transmitted with the same UARFCN and PSC.

As part of the initialization process, relative weights k1 and k2 respectively are assigned to Tier 1 Detected Neighbours and Tier 1 Reciprocated Neighbours. For example k1 might take a value of 0.5, and k2 might take a value of 0.3.

First, the femtocell access point searches for Tier 2 Neighbours that are Detected Neighbours on all UARFCNs of Tier 1 Reciprocated Neighbours. The Relative Position Weight for all such neighbours is set to k2/4.

Second, the femtocell access point searches for Tier 1 Reciprocated Neighbours on all UARFCNs for that enterprise group. As mentioned above, the Relative Position Weight for all such neighbours is set to k2.

Next, the femtocell access point searches for Tier 2 Neighbours that are detected by Tier 1 Detected Neighbours on all UARFCNs of that enterprise group. The Relative Position Weight for all such neighbours is set to k1/4.

Finally, the femtocell access point searches for Tier 1 Detected Neighbours on all UARFCNs for that enterprise group. As mentioned above, the Relative Position Weight for all such neighbours is set to k1.

Thus, the Internal Mobility Table is now populated with possible neighbours, each having an assigned Relative Position Weight.

It is then also possible for the management node 26 to notify the femtocell access point of an Operator Defined Weight for each of the possible neighbours. The default value of the Operator Defined Weight for every UARFCN/PSC/Cell ID combination is 0, but this parameter can take any value in the range from 0 to 1.

The Internal Mobility Table also contains a Handover Success weight for each UARFCN/PSC/Cell ID, and this is updated after each attempted handover from the femtocell access point. Thus, for each UARFCN/PSC/Cell ID combination, the numbers of successful and unsuccessful handover attempts are logged.

After every handover attempt, it is determined whether the attempt succeeded or failed. If the attempt succeeded, the current value of the Handover Success Weight parameter for that UARFCN/PSC/Cell ID is increased. For example, the value of the Handover Success Weight parameter might be increased by 0.1, with an upper limit of 0.5. Conversely, if the attempt failed, the current value of the Handover Success Weight parameter might be decreased by 0.1, with a lower limit of 0.

The Internal Mobility Table is also updated whenever a new or updated MRT is received by the femtocell access point, and whenever any measurement is carried out in the Downlink Monitor Mode of the femtocell access point. More specifically, in these situations, the Relative Position Weights are recalculated.

It is deduced from the MRT whether any of the entries in the existing Internal Mobility Table have become stale, in which case they are removed, or whether there are any new UARFCN/PSC/Cell ID combinations for which entries need to be created. The process of recalculating the Relative Position Weights is then as described above, except that the Internal Mobility Table entries are not initially reset to zero.

The updated Internal Mobility Table is then used thereafter.

A Combined Weight is then calculated for each UARFCN/PSC/Cell ID combination. The Network Operator can define, by means of a parameter notified to the femtocell access point, how to define the Combined Weight.

With a first value of the parameter, the Operator Defined Weight is added to the two Weight values calculated in the femtocell access point. Thus:

Combined Weight=Operator Defined Weight+Relative Position Weight+Handover Success Weight.

With a second value of the parameter, the Operator Defined Weight is not used in calculating the Combined Weight. Thus:

Combined Weight=Relative Position Weight+Handover Success Weight.

With a third value of the parameter, only the Operator Defined Weight is used in calculating the Combined Weight. Thus:

Combined Weight=Operator Defined Weight.

Thus, in this embodiment, when the Relative Position Weight and the Handover Weight are used to calculate the Combined Weight, they are added together, such that they each contribute 50% of the Combined Weight, and this lies in the range from 0 to 1. It will however be appreciated that there are many other ways in which these various parameters can be combined to give a weight to each UARFCN/PSC/Cell ID combination.

Even though the Network Operator may define that the femtocell access point should use only the Operator Defined Weight to calculate the Combined Weight at one particular time, the femtocell access point should nevertheless continue to calculate the Relative Position Weight and Handover Success Weight so that the information is current should the Network Operator change the configuration.

The Combined Weight, calculated as described above, is thus used to set the priority of each cell in the Connected Mode neighbour cell list that is derived from the Internal Mobility Table.

Step 48 shown in FIG. 5 is thus completed, and the illustrated process returns to step 50 in FIG. 4. The femtocell access point needs to include in its Idle Mode and Connected Mode neighbour cell lists cells from the macro layer, and preferably the highest priority macro layer cells. In this embodiment, the same macro layer cells are included in the Idle Mode and Connected Mode neighbour cell lists, and so the process described below is used to find just one set of macro layer neighbours.

Thus, it has been described so far how the External and Internal scrambling codes used by the population of femtocell access points within an enterprise at one particular site are extracted from the MRT to start the creation of the inter-frequency and intra-frequency Idle Mode and Connected Mode neighbour cell lists.

In step 50, the process of adding macro layer neighbours to these lists, to create the complete Idle Mode and Connected Mode neighbour cell lists, is started. Specifically, in step 50, the macro layer cells in the same cellular network (i.e. in the same PLMN) that might be used as neighbours are identified.

For example, cells using scrambling codes that are part of the Internal or External Scrambling Code lists can be excluded, on the basis that they can be assumed to be allocated to femtocells. In this illustrated embodiment, further steps are taken to avoid identifying other nearby femtocells, that might be using a different range of scrambling codes, as macro layer cells. Specifically, where the femtocell access point is able to detect signals from other basestations on all available UARFCNs in its Downlink Monitor Mode, the content of their SIB 7s is also examined. Since femtocell access points can use the SIB 7 to broadcast information about a CPICH adjustment factor that is specific to femtocell access points, only cells whose SIB 7's do not include the CPICH adjustment factor are deemed to be macro layer cells. Thus, it is only these filtered macro layer scrambling codes and their neighbour cell lists that are included in the macro layer neighbour ranking algorithm.

In step 52, the macro layer neighbours that have been identified are grouped, based on information received from the MRT and on information obtained in the Downlink Monitor Mode, by their Radio Access Technology and the carrier that they are using.

More specifically, where the femtocell access point is a UMTS femtocell, the macro layer cells are grouped into UMTS macrocells using the same carrier, UMTS macrocells using different carriers, and GSM (or other) macrocells.

Having been grouped in this way, the neighbours are added to the relevant one of the Intra-frequency, Inter-frequency and Inter-RAT neighbour cell lists, as described in more detail below. In order to identify the highest probability neighbours, the femtocell access point will rely on decoded BCH information of the surrounding femtocell access points in the same enterprise group, and of any macro layer cells detected in the Downlink Monitor Mode, and on the neighbour list information communicated via the MRT.

Each femtocell access point is able to obtain multiple lists of neighbour cells, for example by decoding the lists broadcast by macro layer and femto layer cells in their SIBs, and by examining the MRT. The femtocell access point then uses its measurements of the Received Signal Code Powers (RSCPs) of the detected cells, obtained in Downlink Monitor Mode, in a two stage process to create its macro layer neighbour cell list through a ranking process.

In step 54, the rank for each cell is calculated.

For UMTS macro layer neighbours, the rank is calculated as follows:

Firstly, calculate a weighting constant, $w_i$, for each macro layer cell and each other femtocell access point detected by the femtocell access point in its Downlink Monitor Mode.

$$w_i = \frac{RSCP_i}{RSCP_{max}}$$

where:

$RSCP_i$ is the RSCP value in mW of the $i^{th}$ detected macro layer cell or femtocell access point (i=1, . . . , n), and $RSCP_{max}$ is the largest RSCP value in mW of any detected macro layer cell or femtocell access point.

Secondly, for each macro layer cell or femtocell access point detected by the femtocell access point in its Downlink Monitor Mode, assign the relevant calculated weighting constant to each macro layer cell in the neighbour list owned by that macro layer cell or femtocell access point.

Thirdly, for each macro layer cell that appears in the MRT, assign a fixed weight of 0.01. This ensures that some macro layer cells will still appear in the final neighbour list, even in the extreme case of all the surrounding femtocell access points and macro layer basestations being blocked by the next layer of femtocell access points, but the low weighting of 0.01 implies that these cells would in most situations be truncated from the neighbour list in favour of more likely neighbours.

Fourthly, the rank of each unique UMTS macro layer cell is calculated as the sum of all of the weighting constants assigned to that cell in the previous steps. That is, if a potential neighbour macro layer cell appears in the neighbour lists of more than one other macro layer cell or other femtocell access point, its rank is calculated by adding together the weighting constants calculated in respect of those other macro layer cells or femtocell access points.

For 2G (e.g. GSM) macro layer neighbours, the rank is calculated in a different way. For each detected 2G macro layer neighbour, its rank is first determined by its Rx Level ($Rx\_Lev_i$). Secondly for each derived 2G macro layer neighbour (i.e. a neighbour that cannot be detected directly by the femtocell access point performing the procedure, but that appears in the neighbour cell list of a macro layer cell or another femtocell access point detected by the femtocell access point in its Downlink Monitor Mode), its rank is determined by the weighting constant calculated above for the 3G macro layer cell or femtocell access point in whose neighbour cell list it appears.

Having calculated the rank of the macro layer cells, the process now considers the Intra-frequency, Inter-frequency and Inter-RAT macro layer cells separately.

In step 56, considering only those potential neighbour cells on the same carrier as the femtocell access point performing the procedure, the macro layer cells that are detected by that femtocell access point are added to the neighbour cell list in order of their RSCP, with the cells having the highest RSCP being given the highest priority.

Then, in step 58, the other potential neighbour cells on the same carrier as the femtocell access point performing the procedure are added to the neighbour cell list in order of their rank, calculated as described above.

The intra-frequency neighbour cell list has a maximum size of $N_{intra}$ and so, in step 60, macro layer cells are selected and added to the list until this maximum size is reached.

In step 62, considering only those potential neighbour cells on a different carrier from the femtocell access point performing the procedure, the macro layer cells that are detected by that femtocell access point are added to the neighbour cell list in order of their RSCP, with the cells having the highest RSCP being given the highest priority.

Then, in step 64, the other potential neighbour cells on a different carrier from the femtocell access point performing the procedure are added to the neighbour cell list in order of their rank, calculated as described above.

The inter-frequency neighbour cell list has a maximum size of $N_{inter}$, and so, in step 66, macro layer cells are selected and added to the list until this maximum size is reached.

Considering the Inter-RAT, e.g. GSM, neighbours, in step 68 the macro layer detected neighbours (that is the neighbours that can be detected directly by the femtocell access point performing the procedure) are ranked first. More specifically, the rank of each cell is determined by its Rx Level ($Rx\_Lev_i$), with the cells having the highest received levels being ranked highest.

In step 70, for each derived macro layer neighbour (i.e. a neighbour that cannot be detected directly by the femtocell access point performing the procedure, but that appears in the neighbour cell list of a macro layer cell or another femtocell access point detected by the femtocell access point in its Downlink Monitor Mode), its rank is determined by the weighting constant calculated above for the 3G macro layer cell or femtocell access point in whose neighbour cell list it appears.

In step 72, the cells are added to the lists in order of the rank determined above.

The inter-RAT neighbour cell list has a maximum size of $N_{GSM}$, and so, in step 74, macro layer cells are selected and added to the relevant list until this maximum size is reached.

There is thus disclosed a method for forming the Idle Mode and Connected Mode neighbour cell lists for intra-frequency, inter-frequency and inter-RAT neighbours.

The invention claimed is:

1. A method of operation of a femtocell access point in a cellular communications network, the method comprising:
receiving information about channel numbers, scrambling codes and unique cell identifiers used by femtocell access points in the network;

receiving signals broadcast by other femtocell access points in the network whose transmissions can be detected;

extracting from said received signals information relating to the channel numbers and scrambling codes used by the other femtocell access points whose transmissions can be detected;

upon detecting signals from first and second other femtocell access points that are using the same channel number and scrambling code as each other, the method further comprising:

using different timing offsets of the signals from the first and second other femtocell access points to distinguish between said signals;

extracting from said signals from the first and second other femtocell access points information relating to the unique cell identifiers used by the first and second other femtocell access points; and including at least the first and second other femtocell access points in a neighbour cell list of said femtocell access point.

2. A method as claimed in claim 1, comprising applying time filters around signals detected from the first and second other femtocell access points in order to distinguish between said signals.

3. A femtocell access point for a cellular communications network, the femtocell access point being configured to:

receive information about channel numbers, scrambling codes and unique cell identifiers used by femtocell access points in the network;

receive signals broadcast by other femtocell access points in the network whose transmissions can be detected;

extract from said received signals information relating to the channel numbers and scrambling codes used by the other femtocell access points whose transmissions can be detected;

upon detecting signals from first and second other femtocell access points that are using the same channel number and scrambling code as each other, the femtocell access point being further configured to:

use different timing offsets of the signals from the first and second other femtocell access points to distinguish between said signals;

extract from said signals from the first and second other femtocell access points information relating to the unique cell identifiers used by the first and second other femtocell access points; and include at least the first and second other femtocell access points in a neighbour cell list of said femtocell access point.

4. A femtocell access point as claimed in claim 3, the femtocell access point being further configured to apply time filters around signals detected from the first and second other femtocell access points in order to distinguish between said signals.

5. A network of femtocell access points, connected together through a local area network such that they can exchange information about their respective statuses, each being configured to:

receive information about channel numbers, scrambling codes and unique cell identifiers used by femtocell access points in the network;

receive signals broadcast by other femtocell access points in the network whose transmissions can be detected;

extract from said received signals information relating to the channel numbers and scrambling codes used by the other femtocell access points whose transmissions can be detected;

upon detecting signals from first and second other femtocell access points that are using the same channel number and scrambling code as each other, each femtocell access point being further configured to:

use different timing offsets of the signals from the first and second other femtocell access points to distinguish between said signals;

extract from said signals from the first and second other femtocell access points information relating to the unique cell identifiers used by the first and second other femtocell access points; and include at least the first and second other femtocell access points in a neighbour cell list of said femtocell access point.

6. A network of femtocell access points as claimed in claim 5, wherein each of the femtocell access points of the network is further configured to apply time filters around signals detected from the first and second other femtocell access points in order to distinguish between said signals.

* * * * *